Patented July 26, 1949

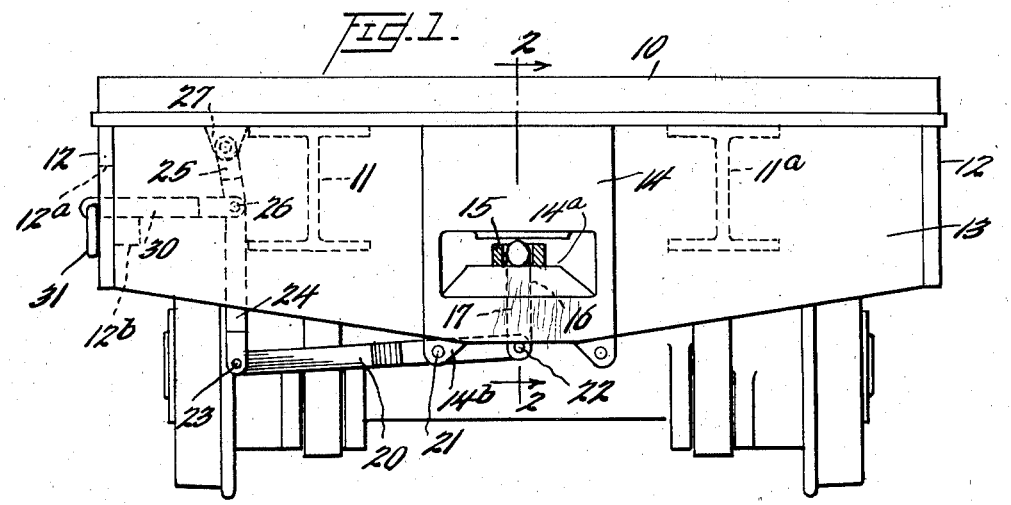
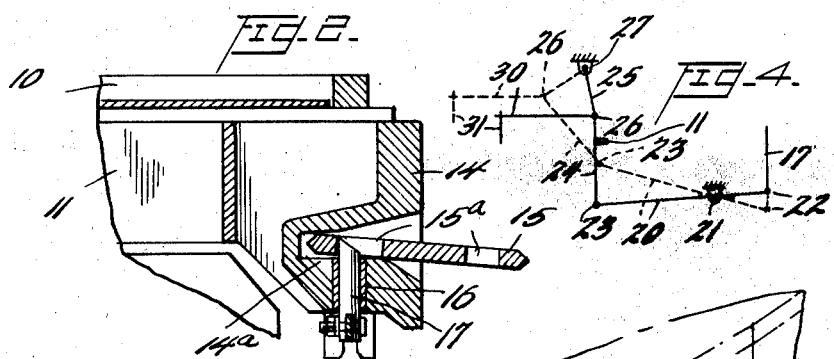
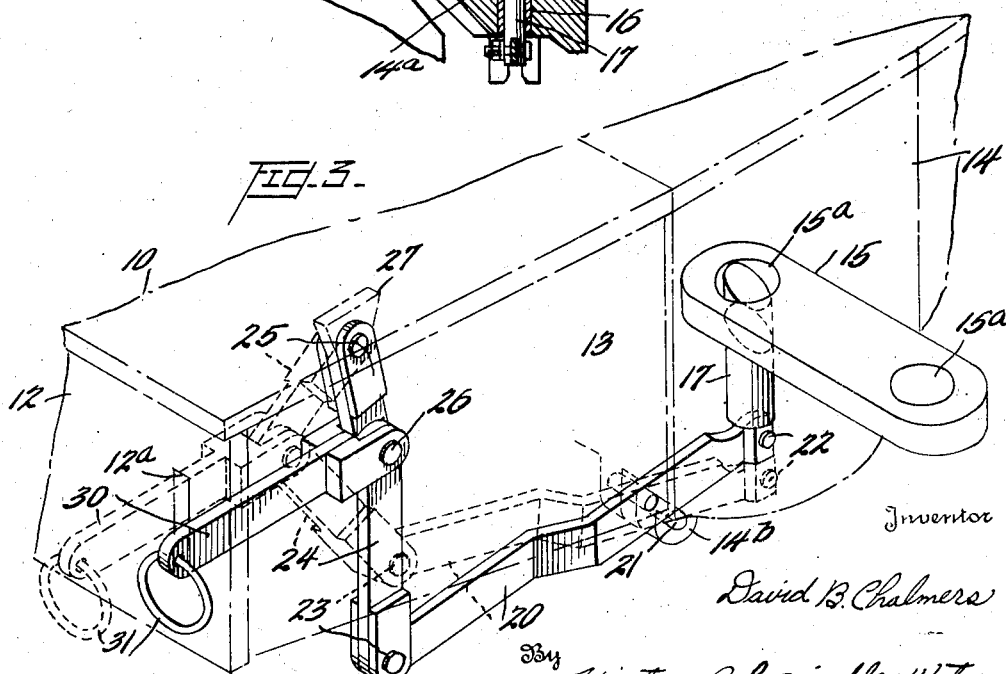

2,477,476

UNITED STATES PATENT OFFICE 2,477,476

COUPLING MECHANISM

David B. Chalmers, Beaver, Pa., assignor to Treadwell Construction Company, Midland, Pa., a corporation of Pennsylvania Application September 7, 1944, Serial No. 553,070

10 Claims. (Cl. 213—192)

This invention relates to coupling mechanisms, and particularly to coupling mechanisms for detachably connecting cars of the heavy duty type such as those frequently employed in and around steel plants in the transportation of ingot molds and other heavy metallic bodies.

It is particularly important that the coupling mechanisms of ingot mold cars be so constructed that accidental uncoupling of two such cars cannot occur and it is a primary purpose of the present invention to provide a coupling mechanism which is so constructed that disconnection of two coupled cars, except by the deliberate action of a workman, will under no circumstances take place. The improved coupler comprises a coupling pin advancing and retracting means which functions entirely automatically, when released by the operator, to move the pin into position to engage the conventional coupler link and which means includes a device for positively locking the coupling pin in operative position. The locking device is preferably in the nature of a toggle and the means in its entirety, including the toggle, is so arranged and proportioned that the associated coupler pin is normally moved to link-engaging position by the action of gravity upon its various parts, whenever released by the operator. The coupler pin is naturally maintained in such position by the operating means. The toggle comprises a positive locking device and is incorporated into the operating means in such manner that the pin may be manually withdrawn, after it has reached operative position, by one standing well to one side of the car. The novel mechanism is of such character as to be operable from one side of the car upon which the coupler is mounted and the inclusion of the toggle gives the operator a considerable mechanical advantage, making it possible for him to exert a very heavy thrust or pull on the coupling pin, if that pin tends to stick, without unduly exerting himself.

In the accompanying drawings one form of the improved coupler operating mechanism is disclosed by way of example. One skilled in the art will appreciate that minor changes in the design and arrangement of its parts may be effected, all without departure from the invention.

In the drawings:

Figure 1 is an end view of a car to which the improved coupler operating means has been applied;

Figure 2 is a section on line 2—2 of Figure 1;

Figure 3 is a perspective view of the mechanism, showing the operating parts in different positions, portions of the car body being indicated to show the precise relationship of the mechanism and car; and Figure 4 is a diagram indicating the extreme positions to which the coupling pin operating mechanism may be moved to effect its normal pin-raising and pin-lowering functions.

The car shown in the drawings is an ingot mold car of conventional type and its details need not be described. It has a flat deck indicated at 10, supported upon longitudinal sills or structural members 11 and 11a and includes depending sides 12 and end plates 13. Advantageously the deck and side and end plates may be fabricated of metal.

Secured, as by welding, to the frame of the car at each end thereof is a coupler block 14 having the shape most clearly shown in Figures 1 and 2, with a horizontally extending recess 14a for the reception of the end of a coupler link 15, a vertical recess 16 extending upwardly from a port formed in the undersurface of the block to, and opening into, the recess 14a. Recess 16 houses a pin 17 the upper end of which is adapted to enter a cylindrical aperture 15a in coupling link 15 and the lower end of which projects at all times from the recess 16. When the pin 17 is depressed so that its upper end is below recess 14a the link 15 may be freely inserted in the recess 14a or withdrawn therefrom. When the pin 17 is raised and enters one or other of the apertures 15a in the link 15 that end of the link is then locked in position. Where an adjacent car is provided with a similar coupling block and coupling pin the two cars can be readily linked together or uncoupled by manipulating either coupling pin.

The pin supporting and manipulating mechanism may be most clearly perceived in Figure 3 of the drawings. It includes a simple lever 20 pivotally mounted upon a pin 21 supported in spaced bearings or ears 14b which comprise portions of the coupling block 14, block 14 being preferably a cast member with ears 14b integral therewith. The lower end of pin 17 is bifurcated and the end of lever 20 is intermediate the bifurcations, being pivotally connected thereto by means of a pin 22. At its opposite end the lever 20 is pivotally connected by means of a pin 23 to the lower end of the lower toggle link 24 of a toggle, the upper link of the toggle being indicated at 25 and the upper and lower links being pivotally connected by means of pin 26. The upper end of the upper toggle link 25 is pivotally connected to a stationary member or lug 27 which may be welded or otherwise suitably secured to the undersurface of the deck 10 of the car. The bifurcated end of an operating bar 30 is pivotally connected to the toggle links 24 and 25, also by the pin 26, bar 30 extending outwardly in a generally horizontal direction and its free end projecting through a slot 12a formed in the side plate 12 of the car. Normally, when the parts occupy the positions in which they are shown in full lines in Figure 3, the operating lever 30 rests upon a block 12b secured to the inner face of side member 12. The end of the operating bar 30 is provided with an operating handle which may be conveniently in the form of a ring 31 which may be easily grasped by the operator.

It is clear that, when the toggle links 24 and 25 occupy the positions in which they are shown in full lines in Figure 3, the lever 20 must necessarily occupy the position in which it is also shown in full lines in this figure, and likewise the coupling pin 17, the upper end of this pin extending into the aperture in the coupling link 15 and the link being held thereby. When it is desired to lower the coupling pin and release the link or coupler 15 the operator will grasp the handle 31 while standing at the side of the car and will pull outwardly upon the bar 30. The toggle will be broken and the parts will assume the positions in which they are illustrated in dotted lines in Figures 3 and 4, the lever 20 being rocked about pin 21 and the coupling pin being lowered. If the toggle be broken and the pin 17 lowered in the manner stated, by an outward pull upon operating bar 30, the longer arm of lever 20, as well as links 24 and 25, will be raised somewhat. It is highly advantageous to so design the coupling pin operating mechanism that the coupling pin not only remains locked in operative position at all times, except when lowered by intent, but so that it also serves to automatically move the pin upwardly into locking position whenever the operating handle is released. To accomplish this the several members of the mechanism are so formed, and so connected to each other and to the car body that the desired result is obtained without the use of springs or auxiliary devices.

Lever 20 is, of course, a simple lever fulcrumed at 21. When the operating bar 30 has been pulled to the left (Figure 1), and the coupling pin 17 lowered, the center of gravity of the mass comprising bar 30, link 25 and link 24 is well to the left of pin 23 and the downward thrust of this mechanism on the end of lever 20 (at 23) is relatively great, link 25 having been raised to nearly horizontal position and transmitting more of its weight to lever 20 through link 24 than when it occupies the position in which it is shown in full lines. Link 24 likewise transmits more of its weight to the lever 20, when in dotted line position, and the net result is that the lever 20 is overbalanced, its longer arm being depressed and its shorter arm, upon which pin 17 is mounted, is elevated. When the parts are as shown in full lines in Figures 1, 3, and 4 they are less effective in depressing lever 20 and the weight of pin 17 (which is unchanged) is great enough to hold lever 20 in the position shown (full lines) and the toggle in locking position. Within the scope of the invention a number of arrangements to bring about this desired action may be proposed but that shown has proven to be very effective in actual use. The side and end plates 12 and 13 house and conceal the toggle mechanism, a feature of considerable importance from a practical standpoint, the chance of possible injuries to this mechanism being greatly reduced.

It will be appreciated by one skilled in the art that minor changes in design and arrangement of the elements of the invention may be made, without departure therefrom, in adapting the same to somewhat different types of coupling mechanisms.

Having thus described the invention, what is claimed as new and desired to be secured by Letters Patent is:

1. The combination with a car of the type described having a frame, coupling block rigid with the frame, and coupling pin slidably retained in a vertical recess formed in the block but projecting below its undersurface, of coupling pin supporting and operating means comprising, a lever pivotally connected intermediate its ends to the car frame, one end of said lever being attached to the exposed lower end of the coupling pin, a toggle device connecting the other end of said lever to the car body, and a toggle operating member for actuating said toggle, the end of said member being accessible to an operator standing at the side of the car.

2. The combination with a car of the type described having a frame, coupling block rigid with the frame, and coupling pin slidably retained in a vertical recess formed in the block but projecting below its undersurface, of coupling pin supporting and operating means comprising, a toggle device the upper end of which is connected to the car body, a lever connecting the lower end of the toggle to the lower end of the coupling pin, said lever being also pivotally connected, at a point intermediate its ends, to the car body, and a toggle operating member extending horizontally from the toggle outwardly to the side of the car.

3. The combination with a car of the type described having a frame, coupling block rigid with the frame, and coupling pin slidably retained in a vertical recess formed in the block but projecting below its undersurface, of coupling pin supporting and operating means comprising, an operating bar, horizontally disposed and projecting laterally from the side of the car body, and means connecting said bar and pin whereby the pin may be raised and lowered when the bar is operated, said means including a toggle which, when locked, secures the pin in coupling retaining position.

4. A coupling pin operating mechanism comprising a substantially horizontal lever to one end of which the coupling pin is attached, means supporting said lever for rocking movement about a horizontal axis intermediate its ends, and a toggle device connected to that end of said lever remote from said pin, the arrangement being such that when the toggle is released after having been operated to lower the coupling pin, the toggle will automatically move into locking position.

5. The combination with a car of the type described of a coupling pin and a coupling pin operating mechanism, said mechanism comprising a substantially horizontal lever to one end of which the coupling pin is connected, means for supporting said lever for rocking movement about a horizontal axis intermediate its ends, a toggle device connected to that end of said lever remote from said pin, an operating bar attached to the toggle, the arrangement being such that when the operating bar is released after having been operated to break the toggle and lower the coupling pin, the toggle will automatically move into locking position, the car having an upwardly facing surface below, and adapted to be engaged by, the operating bar when the toggle is locked.

6. A coupling pin operating mechanism comprising, in combination, a fixed pivot, a substantially horizontal lever mounted upon said pivot for rocking movement in a vertical plane about an axis intermediate its ends, a coupling pin mounted upon one arm of said lever and vertically movable between operative and inoperative positions, a second fixed pivot disposed above the second arm of said lever, a toggle interposed between and connecting said second fixed pivot to a point on the second arm of said lever, below said second pivot, and means limiting the movement of the toggle in one direction, said lever being normally unbalanced by said coupling pin so that the toggle is caused to normally engage said movement limiting means and to maintain the lever against movement and the coupling pin in operative position, the toggle when manually broken to effect movement of the lever and movement of the coupling pin to inoperative position being disposed to overbalance the lever and coupling pin and, when released, to automatically resume its normal position and thus restore the pin to operative position and maintain it in that position.

7. A coupling pin operating mechanism comprising, in combination, a fixed pivot, a substantially horizontal lever mounted upon said pivot for rocking movement in a vertical plane about an axis intermediate its ends, a coupling pin mounted upon one arm of said lever and vertically movable between operative and inoperative positions, a second fixed pivot disposed at a higher elevation than said first pivot and approximately above the free end of the second arm of said lever, a toggle interposed between and connecting said second fixed pivot to a point on the second arm of said lever, and means limiting the movement of the toggle in one direction, said lever being normally unbalanced by said coupling pin so that the toggle is caused to normally engage said movement limiting means and to maintain the lever against movement and the coupling pin in operative position, the toggle when manually broken to effect movement of the lever and movement of the coupling pin to inoperative position being disposed to overbalance the lever and coupling pin and, when released, to automatically resume its normal position and thus restore the pin to operative position and maintain it in that position.

8. A coupling pin operating mechanism comprising, in combination, a fixed pivot, a substantially horizontal lever mounted upon said pivot for rocking movement in a vertical plane about an axis intermediate its ends, a coupling pin mounted upon one arm of said lever and vertically movable between operative and inoperative positions, a second pivot disposed above the second arm of said lever, a toggle interposed between and connecting said second fixed pivot to the second arm of said lever, and means limiting the movement of the toggle in one direction with the toggle links angularly disposed but both extending substantially vertically, said lever being normally unbalanced by said coupling pin so that the toggle is caused to normally engage said movement limiting means and to maintain the lever against movement and the coupling pin in operative position, the toggle when manually broken to effect movement of the lever and movement of the coupling pin to inoperative position being disposed to overbalance the lever and coupling pin and, when released, to automatically resume its normal position and thus restore the pin to operative position and maintain it in that position.

9. The combination set forth in claim 6 in which a toggle operating link is provided, such link being pivotally connected to the toggle and extending laterally therefrom.

10. The combination set forth in claim 6 in which said first fixed pivot is relatively close to the coupling pin and relatively remote from the toggle.

DAVID B. CHALMERS.

REFERENCES CITED

The following references are of record in the file of this patent:

UNITED STATES PATENTS

| Number | Name | Date |
|---|---|---|
| 467,326 | Wells | Jan. 19, 1892 |
| 1,239,862 | Baird | Sept. 11, 1917 |
| 1,442,216 | Flinn | Jan. 16, 1923 |
| 1,876,341 | Olcsvary | Sept. 6, 1932 |
| 1,985,379 | Maconaghie | Dec. 25, 1934 |

FOREIGN PATENTS

| Number | Country | Date |
|---|---|---|
| 370,191 | Germany | Feb. 28, 1923 |